United States Patent [19]

Sederquist

[11] 4,071,330
[45] Jan. 31, 1978

[54] STEAM REFORMING PROCESS AND APPARATUS THEREFOR

[75] Inventor: Richard A. Sederquist, Newington, Conn.

[73] Assignee: United Technologies Corporation, Hartford, Conn.

[21] Appl. No.: 753,341

[22] Filed: Dec. 22, 1976

[51] Int. Cl.² .................... C01B 2/16; B01J 7/00
[52] U.S. Cl. .................... 48/94; 23/277 R; 23/288 M; 48/214 A; 252/373; 423/652; 423/653
[58] Field of Search .............. 48/93, 94, 95, 105, 48/196 A, 214 A; 252/373; 423/651, 652, 653, 654; 23/288 K, 288 H, 288 M, 288 R, 289, 277 R; 165/154, 155, 142, 134, 171; 122/367 PF

[56] References Cited

U.S. PATENT DOCUMENTS

| | | | |
|---|---|---|---|
| 3,144,312 | 8/1964 | Mertens | 48/95 |
| 3,541,729 | 11/1970 | Pantowitz | 48/94 |
| 3,645,701 | 2/1972 | Banckik et al. | 48/196 A |
| 3,909,299 | 9/1975 | Corrigan | 48/94 |

Primary Examiner—S. Leon Bashore
Assistant Examiner—Peter F. Kratz
Attorney, Agent, or Firm—Stephen E. Revis

[57] ABSTRACT

A tubular catalytic reactor, such as for steam reforming a hydrocarbon feedstock to produce hydrogen, is disposed within a furnace and includes an annular first bed of reaction catalyst. A second bed of reaction catalyst is disposed coaxial with the first bed and inwardly thereof. Product gases from the first bed, without adding heat thereto, are passed through the second bed essentially adiabatically resulting in a substantial reduction in the amount of unreacted hydrocarbons heavier than methane which were present in the product gases leaving the first bed. The apparatus is compact and uses only the sensible heat in the reaction products leaving the first bed to reduce the level of unwanted hydrocarbons. Thus, in the process of the present invention, the reduction in the level of unwanted heavier hydrocarbons is accomplished in compact apparatus without burning additional fuel and without extracting additional heat energy from the furnace.

7 Claims, 2 Drawing Figures

STEAM REFORMING PROCESS AND APPARATUS THEREFOR

BACKGROUND OF THE INVENTION

1. Field of the Invention

This invention relates to processing a hydrocarbon feedstock, and more particularly to steam reforming a hydrocarbon feedstock.

2. Description of the Prior Art

The production of hydrogen by the process of steam reforming is well known in the art. Briefly, a mixture of hydrocarbon fuel and steam, usually in vapor form, is passed through a vessel containing a steam reforming catalyst. Typically, the vessel is a catalyst filled tube disposed within a furnace. Heat from the furnace drives the endothermic steam reforming reaction. It is possible, with current technology, to convert all of the available hydrocarbons to essentially hydrogen, carbon monoxide, and carbon dioxide; however, disadvantages of prior art techniques for achieving very high conversion rates are one or more of the following: (1) higher furnace temperatures, (2) larger or more reactors, and (3) burning additional fuel in the furnace.

One typical technique for increasing the conversion rate is to pass the reaction products from a primary catalyst bed into and through a second catalyst bed while adding air to the second bed and burning some of the hydrogen already produced; this increases the temperature of the reaction products as they flow through the second bed to yield additional hydrogen. This technique is shown in U.S. Pat. No. 2,700,598 to Odell. Although there may be some advantages to this approach, clearly all the available hydrogen in the process fuel cannot become a product of the reactor since some of it is burned within the reactor.

Another technique is shown in Faatz, Jr. U.S. Pat. No. 2,813,779. In Faatz, Jr. a primary steam reforming reactor is disposed within a furnace. Reaction products from the primary reactor are preheated in the furnace to a high temperature and are then passed through a second catalyst bed external of the furnace wherein additional conversion of hydrocarbon takes place in an adiabatic reaction using the sensible heat in the preheated primary reaction products. Faatz, Jr. claims that by his invention unreacted hydrocarbons are reduced to concentrations less than 0.3 mole percent (1) without increasing the number of tubes in the furnace, (2) without increasing the temperature in the furnace, and (3) without increasing the amount of catalyst employed. For this to be true the Faatz, Jr. primary reaction apparatus must be relatively inefficient. The teachings of Faatz, Jr. cannot be utilized with very efficient primary reaction apparatus, since extracting heat from the furnace to preheat the reaction products would be inconsistent with maximizing efficiency within the primary reaction apparatus. Perhaps the reason Faatz, Jr. claims he can extract heat energy from the furnace to preheat the primary reaction products without having any negative effect on the primary reaction process is because the furnace contains a large amount of what otherwise would be waste heat (i.e., heat which is available for use in the primary reaction tubes but which cannot be used therein due to inefficiencies of the system). Furthermore, Faatz, Jr. does not lend itself to being compact since the second catalyst bed is outside of the furnace.

SUMMARY OF THE INVENTION

One object of the present invention is an improved process for steam reforming hydrocarbons.

Another object of the present invention is a highly efficient, compact steam reforming reaction apparatus capable of converting up to 100% of the heavy and intermediate hydrocarbons to essentially hydrogen, methane, carbon monoxide, and carbon dioxide.

According to the present invention, a tubular catalytic reactor is disposed within a furnace which is divided into an enhanced heat transfer portion and a burner cavity. The reactor is disposed partly within the burner cavity and partly within the heat transfer portion, and includes an annular first bed of reaction catalyst and a second bed of reaction catalyst disposed coaxial therewith and inwardly of the first bed. The product gases from the first bed, without adding heat, are passed through the second bed essentially adiabatically resulting in a substantial reduction in the amount of unreacted hydrocarbons heavier than methane which were present in the product gases leaving the first bed.

Although any methane in the product gases leaving the first bed may be in thermodynamic equilibrium or close to it, hydrocarbons heavier than methane are not in thermodynamic equilibrium and can be reacted in the second catalyst bed using only the sensible heat within the product gases. For example, if 90% of the hydrocarbons heavier than methane are reacted within the first bed, the remaining hydrocarbons heavier than methane will react within the second bed and be completely converted to hydrogen, methane, CO, and $CO_2$ with about a 200° F temperature drop through the second bed. In other words, 10% unreacted hydrocarbons can be eliminated with a 200° F $\Delta T$ through the second bed. Only about a 20° F drop in temperature is required for each one percent of unreacted hydrocarbons heavier than methane. The volume of the second catalyst bed is chosen so as to be able to achieve the required temperature drop.

In a preferred embodiment the furnace gases within the enhanced heat transfer portion flow countercurrent to the flow in the first catalyst bed through a relatively narrow annulus surrounding the first bed. Heat transfer effectiveness is greatly improved in this area. The reaction products from the first bed flow through the second catalyst bed and thence flow countercurrent to the flow through the first bed within an annular regeneration chamber disposed coaxially with and inwardly adjacent the primary reaction chamber. The regeneration chamber provides additional heat transfer from the reaction products back into the first bed thereby increasing the reactor thermal efficiency.

In a highly efficient, compact steam reforming reactor, as much available heat energy from the furnace as possible is channeled into the reaction chamber to further the reaction. The more efficient the system, the lower the average temperature within the furnace and the reaction chamber as compared to a less efficient system having the same rate of process fuel throughput. Unfortunately, the lower temperature of the efficient system can result in a higher level of unreacted hydrocarbons heavier than methane; these unreacted hydrocarbons may be very undesirable depending upon the use to which the final product is to be put. The present invention substantially reduces and has the capability of completely eliminating these heavier hydrocarbons with compact apparatus, and without using any source of energy other than the energy already possessed by the product gases themselves.

As used herein the heat transfer effectiveness ($\epsilon$) is equal to the change in enthalpy of the heating stream divided by the theoretical maximum change in enthalpy. In other words, if the heating stream has an enthalpy of $E_1$ at its inlet temperature of $T_1$ and an enthalpy of $E_2$ at its exit temperature of $T_2$, and if the heated stream has a temperature of $T_3$ at its inlet, then the heat transfer effectiveness as between the two streams is given by the following equation:

$$\epsilon = E_1 - E_2/E_1 - E_3$$

where $E_3$ is the enthalpy of the heating stream calculated at the temperature $T_3$.

Reactor thermal efficiency ($\eta$) is herein defined as follows:

$$\eta = \frac{(N_{H_2}) \cdot (LHV_{H_2})}{(F_r)(LHV_r) + F_f(LHV_f)}$$

where $N_{H_2}$ is the net amount of hydrogen produced, $LHV_{H_2}$ is the lower heating value of hydrogen, $F_r$ is the amount of process fuel fed to the reactor, $F_f$ is the amount of fuel fed to the furnace, and $LHV_r$ and $LHV_f$ are the lower heating values of the process and furnace fuel, respectively. The foregoing assumes hydrogen is the desired reaction product.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENTS

Figure 1:
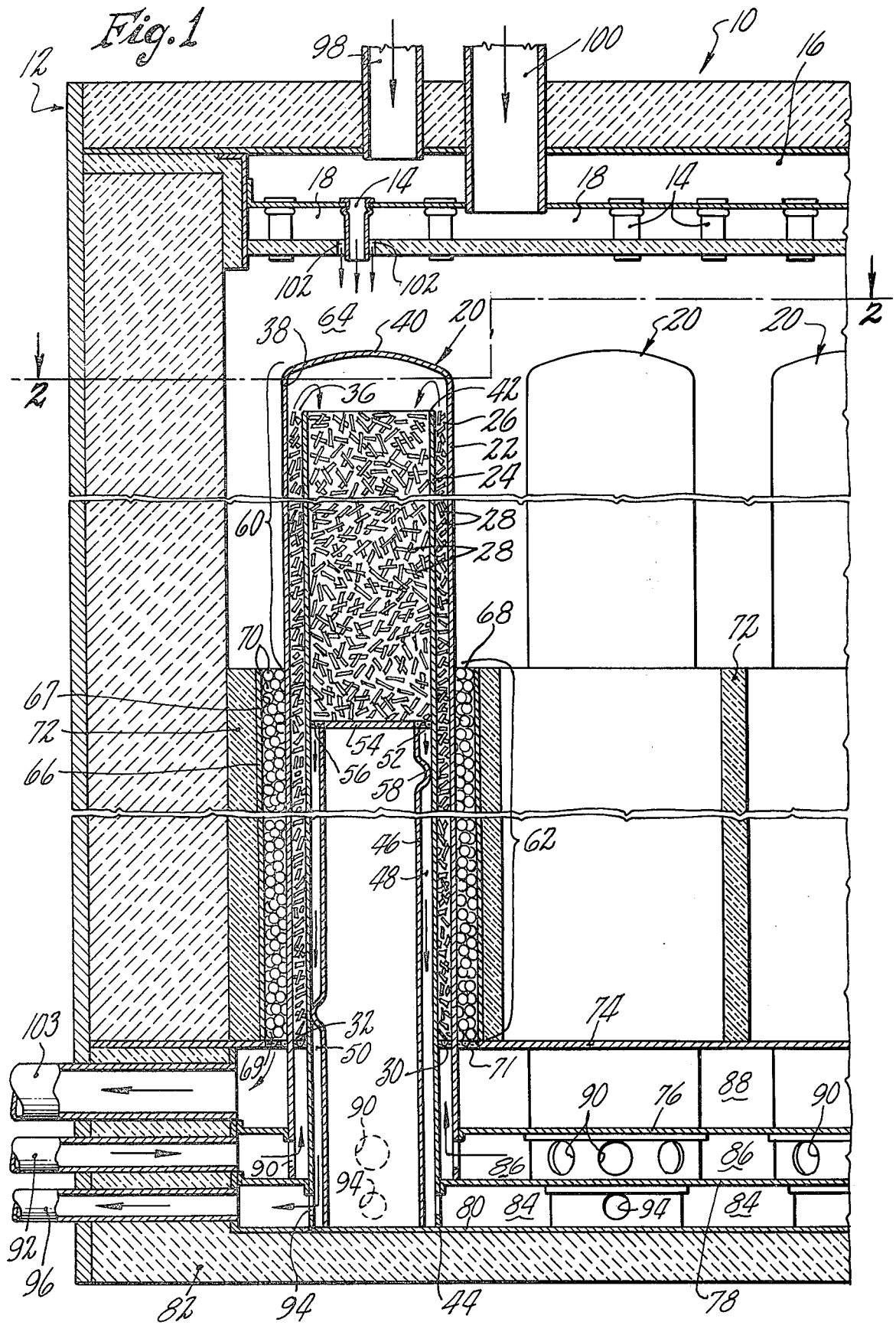
FIG. 1 is a fragmentary, vertical cross-sectional view of catalytic reaction apparatus according to the present invention.
Figure 2:
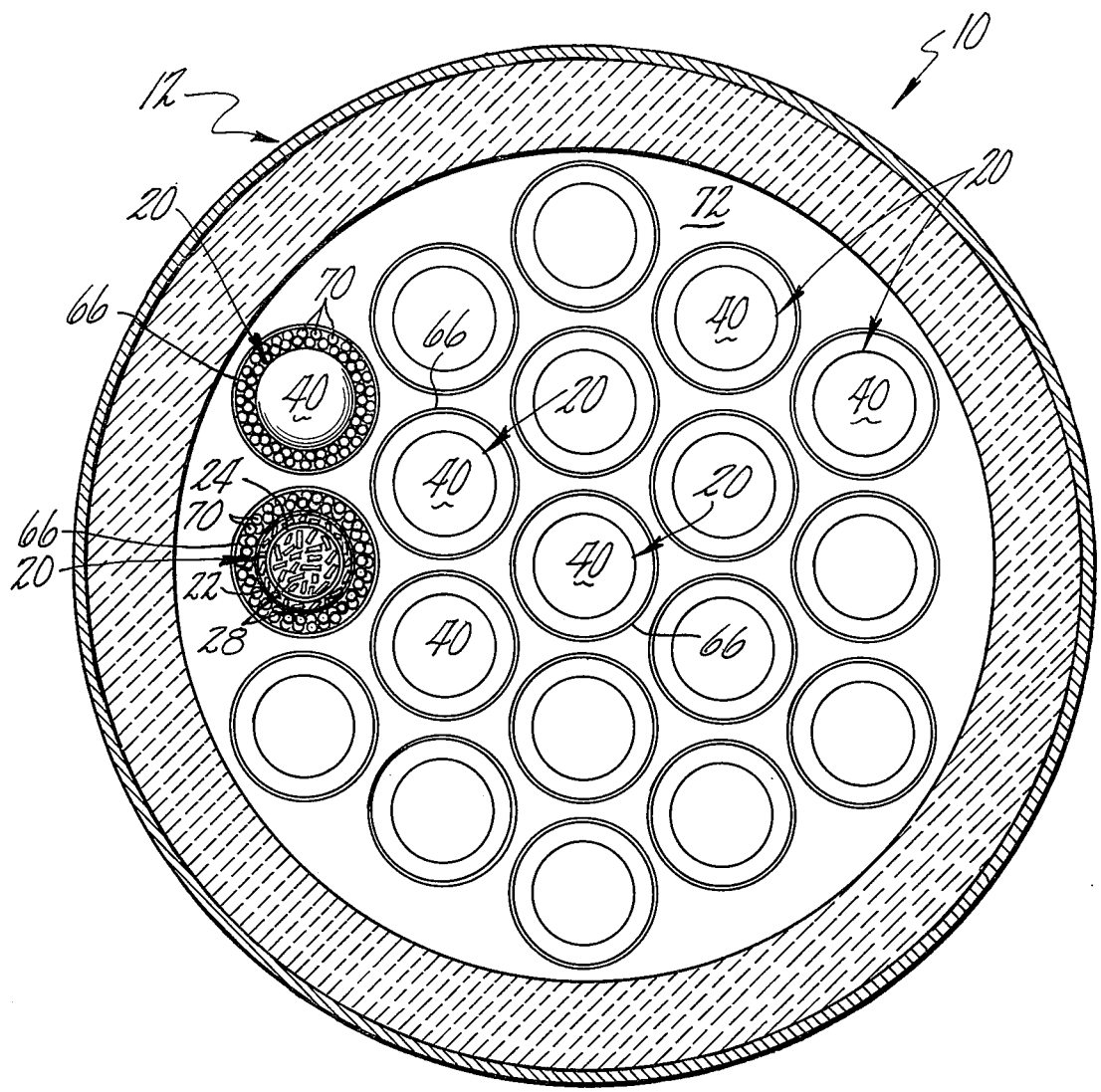
FIG. 2 is a cross-sectional view of the apparatus of FIG. 1 taken substantially along the line 2—2 of FIG. 1.

Consider, as an exemplary embodiment of the present invention, the catalytic reaction apparatus 10 of FIGS. 1 and 2. In this embodiment, the apparatus is for the purpose of steam reforming a reformable hydrocarbon fuel in the presence of a suitable catalyst in order to product hydrogen. The apparatus 10 comprises a furnace 12 including burner nozzles 14, a burner fuel manifold 16, and an air manifold 18. Disposed within the furnace 12 are a plurality of tubular reactors 20.

Each reactor 20 comprises an outer cylindrical wall 22 and an inner cylindrical wall or center tube 24 defining an annular reaction chamber 26 therebetween. These walls are made from heat conducting material such as high nickel-chrome steel. The reaction chamber 26 is filled with steam reforming catalyst pellets 28 which are supported on a screen 30 disposed at the inlet 32 of the reaction chamber. Any suitable reforming catalyst, such as nickel, may be used to fill the reaction chamber from its inlet 32 to its outlet 36. The cylinder which is defined by the outer wall 22 is closed at its upper end 38 by an end cap 40. The center tube 24 has an upper inlet end 42 and a lower outlet end 44. The inlet end 42 terminates below the end cap 40 such that the center tube is in gas communication with the outlet 36 of the reaction chamber 26.

Disposed within the center tube is a cylindrical plug 46 which has an outer diameter somewhat smaller than the inner diameter of the center tube thereby defining an annular regeneration chamber 48 therebetween. The regeneration chamber has an outlet 50 adjacent the inlet 32 of the reaction chamber and an inlet 52. The portion of the center tube above the plug 46 is filled with the same catalyst as the reaction chamber 26 (although any other suitable catalyst may be used). The plug 40 may be a solid rod, but in this embodiment is a tube which is blocked by an end cap 54 at one end such that reaction products exiting the reaction chamber 26 must flow into the center tube, through the second catalyst bed, and around the plug 46 through the regeneration chamber 48. The second catalyst bed rests on the end cap 54 and on an annular perforated plate or screen 56 which is attached to the plug 46. Dimples 58 center the plug 46 within the center tube. The function of the regeneration chamber 48 is to return heat from the reaction products leaving the outlet 36 (and which still remains therein after the reaction products leave the second catalyst bed) back into the first catalyst bed.

The arrangement shown in FIG. 1 provides some preheating of the process fuel by the regeneration chamber before the process fuel enters the first catalyst bed. Note, also, that the second catalyst bed and the regeneration chamber are substantially isolated from the hot furnace gases. For maximum overall reactor thermal efficiency it is important to prevent the heat energy of the furnace gas from heating the reaction products within the regeneration chamber or the second catalyst bed. It is also important to avoid the burning of additional fuel or hydrogen within the second catalyst bed or within the regeneration chamber. Only sensible heat already in the reaction products at the outlet 36 is transferred to either the second catalyst bed or is returned to the first catalyst bed by means of the regeneration chamber.

Each reactor 20 may be considered to comprise an upper portion 60 and a lower portion 62. The upper portion 60 is disposed within what is hereinafter referred to as the burner cavity 64. The cavity 64 is that volume of the furnace 12 within which actual combustion of the fuel and air fed into the furnace takes place. This volume is characterized by very high temperatures, considerable radiant heating as well as convective heating of the reactors 20, and axial (i.e., in the direction of the axis of the reactors 20) as well as radial mixing of the gases therein.

The lower portion 62 of each reactor is surrounded by a cylindrical wall or conduit 66 spaced outwardly from the wall 22 defining a narrow annular burner gas passageway 67 therebetween having an inlet 68 and an outlet 69. The passageway 67 is filled with a heat transfer packing material such as spheres 70 of alumina supported on a screen 71. The space 72 between adjacent conduits 66 is filled with a nonheat conductive material such as ceramic fiber insulation which is supported on a plate 74 extending across the furnace and which has holes therein through which the reactors 20 pass. The plate 74 and the material within the space 72 prevents the furnace gases from flowing around the outside of the conduits 66.

The portion of the furnace surrounding the lower portions 62 of the reactors is hereinafter referred to as the enhanced heat transfer portion. In this embodiment the filled annular passageway 67 increases the heat transfer effectiveness between the heating and heated streams. Other techniques for enhancing heat transfer effectiveness over the lower portions of the reactors are shown in copending, commonly owned, United States patent application Ser. No. 753,334 titled "Multi-tube Catalytic Reaction Apparatus" by R. Buswell, R. Sederquist, and D. Snopkowski filed on even date herewith.

In addition to the plate 74, plates 76, 78, and 80 also extend across the furnace and define manifolds therebetween. The plate 80 rests on the bottom wall 82 of the furnace. The plates 78 and 80 define a reaction products manifold 84 therebetween; the plates 76 and 78 define a process fuel inlet manifold 86 therebetween; and, the plates 74 and 76 define a furnace gas outlet manifold 88 therebetween. The plugs 46 and the center tubes 24 abut the bottom plate 80; the outer walls 22 of the reactors abut the plate 78; and, the conduits 66 abut the plate 74.

Although not shown in any of the figures, means should be provided to prevent fluidization of the first catalyst bed as a result of the upward flowing process gas. For example, the anti-fluidization means described in commonly owned, copending U.S. patent application Ser. No. 753,336 titled "Upflow Catalytic Reaction Apparatus With Anti-fluidization Means" by R. Masters, R. Sederquist, and D. Szydlowski filed on even date herewith could be used, and is incorporated herein by reference.

In operation, a mixture of steam and reformable hydrocarbon fuel from the manifold 86 enters the inlet 32 of the reaction chamber 26 by way of the holes 90 in the wall 22; the manifold 86 is fed by a conduit 92. The mixture immediately begins to be heated by the furnace gases flowing countercurrent thereto through the passageway 67 and begins to react in the presence of the catalyst particles 28. As the fuel, steam and reaction products travel upward within the reaction chamber 26 they continue to react and pick up additional heat. At the outlet 36 the temperature of the reaction products reaches a maximum and may be anywhere from 1300°–1600° F. They may contain up to 15% of the original amount of hydrocarbons heavier than methane. The hot reaction products thereupon enter the second catalyst bed. The unreacted hydrocarbons heavier than methane are converted to hydrogen, methane, CO, and $CO_2$ in an essentially adiabatic reaction, using only the heat in the product gas leaving the first catalyst bed. If virtually total elimination of these heavier hydrocarbons is required, a sufficient volume of catalyst is provided such that about a 20° F drop in temperature through the bed is realized for each 1% unreacted heavier hydrocarbons entering the second bed. Less may be provided if some of these heavier hydrocarbons are tolerable in the final product. It is preferred to use, in the second bed, the minimum volume of catalyst needed to achieve the desired reduction in heavier hydrocarbons in order that the length of the regeneration chamber can be maximized. The volume needed can readily be calculated by persons having ordinary skill in the art. The reaction products from the second bed thereupon enter the inlet 52 of the regeneration chamber 48. As the reaction products traverse the length of the annular regeneration chamber 48 heat is transferred therefrom back into the reaction chamber 26. They thereupon enter the reaction products manifold 84 through the holes 94 in the center tube 24, and are carried away from the reactor via the conduit 96 either for further processing, storage, or consumption.

Fuel for the furnace enters the manifold 16 via a conduit 98 and thereupon passes into the burner cavity 64 by way of the nozzles 14. Air enters the manifold 18 via a conduit 100 and enters the burner cavity 64 via annular passageways 102 surrounding each nozzle 14. Burning of the fuel and air takes place within the burner cavity 64. The hot gases from the burner cavity travel through the passageways 67 into the manifold 88 and are exhausted via the conduit 103. Within the burner cavity temperatures are generally sufficiently high that high heating rates (i.e., the rate at which heat is being transferred from the hot gases in the furnace into the reaction stream per unit of wall surface area separating the two streams) are obtained over the upper portions 60 of the reaction chambers despite the relatively low heat transfer coefficient in that area. As the furnace gases drop in temperature while moving further away from the burner nozzles the heating rate would normally become unacceptably low; however, this is counteracted by the present invention by the use of the annular burner gas passageways 67 over the lower portions 62 of the reactors. These passageways, when properly sized, increase the local heat transfer coefficient and thus the heat transfer effectiveness levels. This results in high heating rates over both the upper and lower portions 60, 62 despite the lower temperatures of the furnace gases over the lower portions. Further details regarding maximizing thermal efficiency of the first catalyst bed may be found in copending U.S. Patent Application Ser. No. 753,348 titled "Catalytic Reaction Apparatus" by R. Buswell, R. Sederquist, and D. Snopkowski filed on even date herewith and which is incorporated herein by reference.

It should be apparent that the manifolding arrangement and burner construction shown in the drawing are by way of example only and are not critical to or a part of the present invention, the invention being applicable to a single reactor within a furnace as well as many reactors.

A related commonly owned, copending U.S. patent application Ser. No. 753,335 titled "Compact Multi-tube Catalytic Reaction Apparatus" by G. Krar, O. Olesen, R. Sederquist, and D. Szydlowski, filed on even date herewith teaches apparatus for obtaining more uniform heating of those portions (i.e., upper portions) of the reactors extending into the burner cavity. These teachings may be incorporated into the apparatus of the present invention if desired.

EXAMPLE

In a test using a single reactor tube disposed in a furnace and having a configuration similar to one of the reactor tubes shown in FIGS. 1 and 2, the annular reaction chamber 22 had an outer diameter of 3.8 inches, an inner diameter of 1.8 inches, and a length of 16.0 inches. The radial gap size of the regeneration chamber 48 was 0.25 inch. The second catalyst bed was a cylinder about 12 inches long and about 1.6 inches in diameter. The same steam reforming catalyst was used in both beds and consisted of cylindrical pellets. The process fuel was heating oil desulfurized to the extent that it contained only 100 ppm sulfur. This fuel entered the primary catalyst bed as a vapor mixed with about 5.0 parts steam per pound of fuel, by weight. Its temperature at the outlet 36 of the first catalyst bed was about 1550° F. The rate of process fuel flow was about 2.5 lb/hr.

In this example 91% of the hydrocarbons heavier than methane in the process fuel were reacted in the first catalyst bed. This product gas passed through the second catalyst bed, leaving at a temperature of about 1400° F. At this point 98% of the original hydrocarbons heavier than methane had been reacted. At the inlet to the second catalyst bed the ethylene concentration was 15,000 ppm; leaving the second catalyst bed the ethylene concentration was 300 ppm. The small reactor outer diameter and small diametral dimension of the second catalyst bed prevented the incorporation of sufficient second bed catalyst to eliminate all the hydrocarbons heavier than methane.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A process for steam reforming a hydrocarbon feedstock comprising the steps of:

introducing a vaporous mixture of a hydrocarbon feedstock and steam into and through a first steam reforming catalyst bed disposed within an annular reaction chamber positioned within a furnace, said reaction chamber being defined by inner and outer concentric, spaced apart conduits;

burning a fuel and an oxidant within said furnace to provide heat to the first catalyst bed including flowing the hot furnace gases over the outer surface of the outer conduit countercurrent to the flow of said feedstock and steam mixture flowing through the first catalyst bed, wherein the reaction products leaving the first bed include unreacted hydrocarbons heavier than methane;

passing the reaction products, without further heating, from the first catalyst bed through a second steam reforming catalyst bed essentially adiabatically, the second bed being disposed within the inner conduit, wherein said unreacted hydrocarbons heavier than methane in the reaction products leaving the first bed are substantially reduced using essentially only the sensible heat within the reaction products leaving the first bed; and returning, to the first bed, only the sensible heat in the reaction products leaving the second bed by passing the reaction products from the second bed through an annular heat regeneration chamber coaxial with said first bed and disposed inwardly of and adjacent said first bed and in heat exchange relationship thereto, the flow through the regeneration chamber being countercurrent to the flow through the first bed.

2. The process according to claim 1 wherein said step of flowing the hot furnace gases over the outer surface of the reaction chamber includes flowing said gases through a narrow annular passageway surrounding said reaction chamber.

3. The process according to claim 1 wherein the temperature of the gases passing through said second catalyst bed are reduced by about 20° F for each 1% unreacted hydrocarbon heavier than methane in the first bed reaction products, thereby virtually eliminating said hydrocarbons.

4. The process according to claim 1 wherein said mixture of feedstock and steam is passed upwardly through said first bed.

5. Steam reforming catalytic reaction apparatus comprising:

a furnace for supplying heat for an endothermic steam reforming reaction, including an enhanced heat transfer portion and wall means defining a burner cavity, said furnace also including means associated with said burner cavity for introducing fuel and an oxidant into said burner cavity;

a plurality of tubular reactors disposed within said furnace, each including a first portion positioned within said burner cavity and a second portion, said second portion being an extension of said first portion and positioned within said enhanced heat transfer portion of said furnace, each of said reactors including inner and outer wall means defining an annular reaction chamber therebetween in heat exchange relationship to said enhanced heat transfer portion of said furnace and having a first bed of steam reforming catalyst therein, said first bed including an inlet end and an outlet end, said outlet end being disposed within said first portion of said reactor, said inner wall means defining a center tube coaxial with said reaction chamber and inwardly adjacent thereto;

said center tube including a catalyst portion and a regeneration portion, said catalyst portion having a second steam reforming catalyst bed therein, said bed including inlet means and outlet means, said reactor including means for directing reaction products from said outlet end of said first catalyst bed into said inlet end of said second catalyst bed and through said second catalyst bed, said reactor being constructed and arranged for essentially adiabatically reacting, in said second bed, the reaction products from said first bed, using only the sensible heat in the reaction products from said first bed;

cylindrical plug means disposed concentrically within said center tube and having an outer wall surface spaced inwardly from said center tube defining an annular heat regeneration chamber coaxial with and adjacent said reaction chamber and in heat exchange relationship thereto, said annular regeneration chamber having an inlet end in communication with said second bed outlet means and an outlet end adjacent said first catalyst bed inlet end, said reactor including means for directing the reaction products from said second catalyst bed outlet means into said regeneration chamber inlet end and through said regeneration chamber countercurrent to the flow through said first catalyst bed;

said furnace including heat transfer means disposed within said enhanced heat transfer portion for increasing the heat transfer effectiveness over said second portions of said reaction chambers, said furnace being constructed and arranged wherein the furnace gases flow over said second portions of said reaction chambers countercurrent to the flow through said first catalyst beds.

6. The apparatus according to claim 5 wherein said heat transfer means comprises wall means defining a narrow annular burner gas passageway surrounding said second portion of each reactor, said furnace including means causing all furnace gases to pass through said burner gas passageways.

7. The apparatus according to claim 5 wherein said reactors are vertically disposed within said furnace, each including an upper end and a lower end, said first bed inlet end being at said lower end.

* * * * *